C. E. WAXBOM
March 3, 1931.
Re. 17,986
COAL MINING APPARATUS
Original Filed Dec. 26, 1923 2 Sheets-Sheet 1
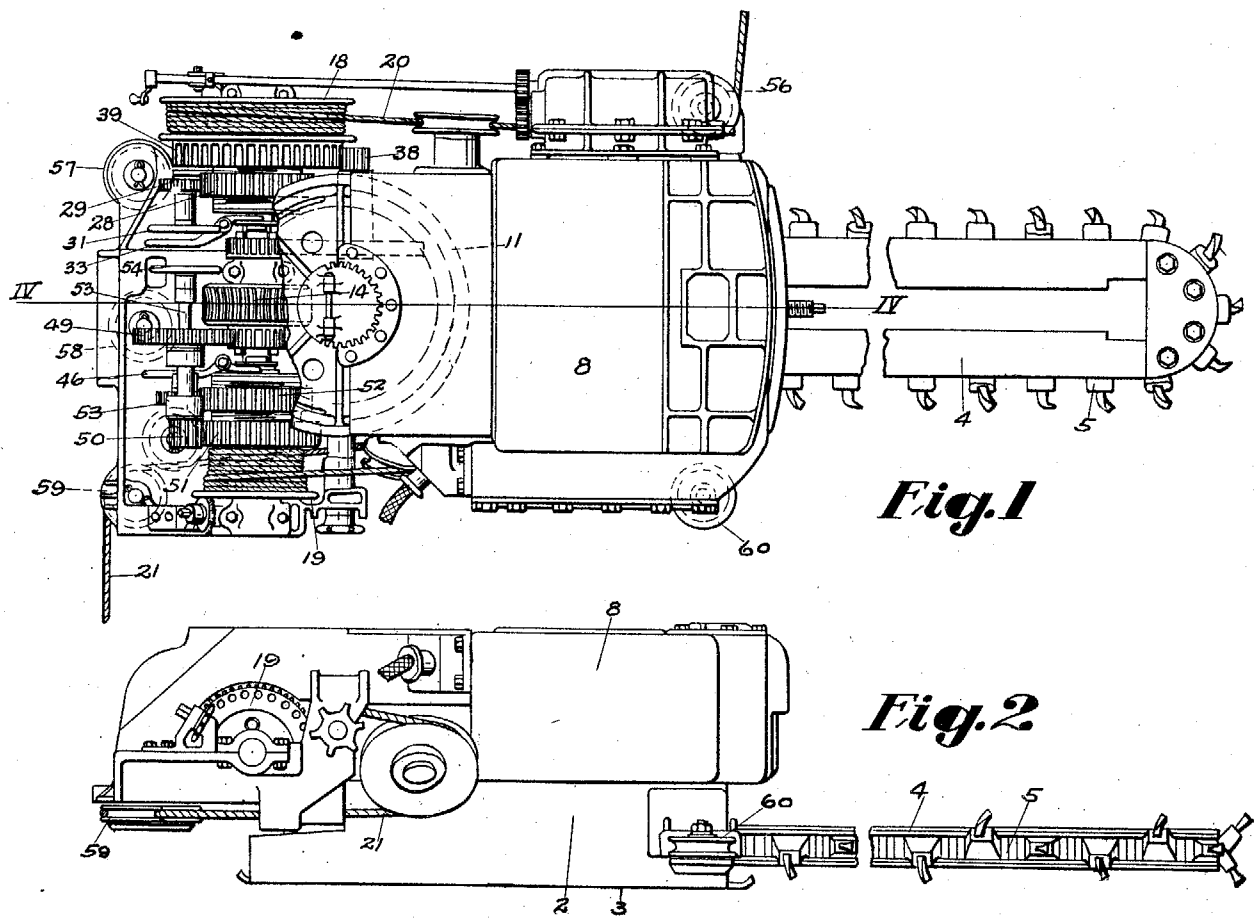
Witnesses:
R. D. Nichols.
Dudley J. Fisher
INVENTOR
Charles E. Waxbom
BY
Cushman, Bryant & Darby
ATTORNEYS

C. E. WAXBOM

March 3, 1931.

Re. 17,986

COAL MINING APPARATUS

Original Filed Dec. 26, 1923 2 Sheets-Sheet 2

Witnesses:

R. D. Nichols

Dudley T. Fisher

INVENTOR

Charles E. Waxbom

BY

Cornelius Bryant & Darby

ATTORNEYS

Reissued Mar. 3, 1931

Re. 17,986

UNITED STATES PATENT OFFICE

CHARLES E. WAXBOM, OF COLUMBUS, OHIO, ASSIGNOR TO THE JEFFREY MANUFACTURING COMPANY, OF COLUMBUS, OHIO, A CORPORATION OF OHIO

COAL-MINING APPARATUS

Original No. 1,582,949, dated May 4, 1926, Serial No. 682,726, filed December 26, 1923. Application for reissue filed June 25, 1930. Serial No. 463,798.

The present invention relates to certain new and useful improvements in mining machines, and particularly to the class of mining machines in which each is provided with a main frame adapted to rest upon and slide in any direction over the mine floor, an elongated horizontally extending cutter arm attached to said frame, and means to move and guide said main frame over the mine floor to cause the cutter arm to engage the coal to cut it.

The especial object of this invention is to provide, in a machine of the class described, improved feeding and guiding mechanism whereby the machine may be moved over the mine floor at the speed most appropriate to the purpose intended.

The preferred embodiment of my invention is disclosed in the following specification and illustrated in the accompanying drawings of which, Figure 1 is a plan view of the machine, certain parts being broken away to reveal other parts.

Figure 2 is a side elevation of the machine illustrated in Figure 1.

Like numerals refer to similar parts in the several figures.

Figure 3:
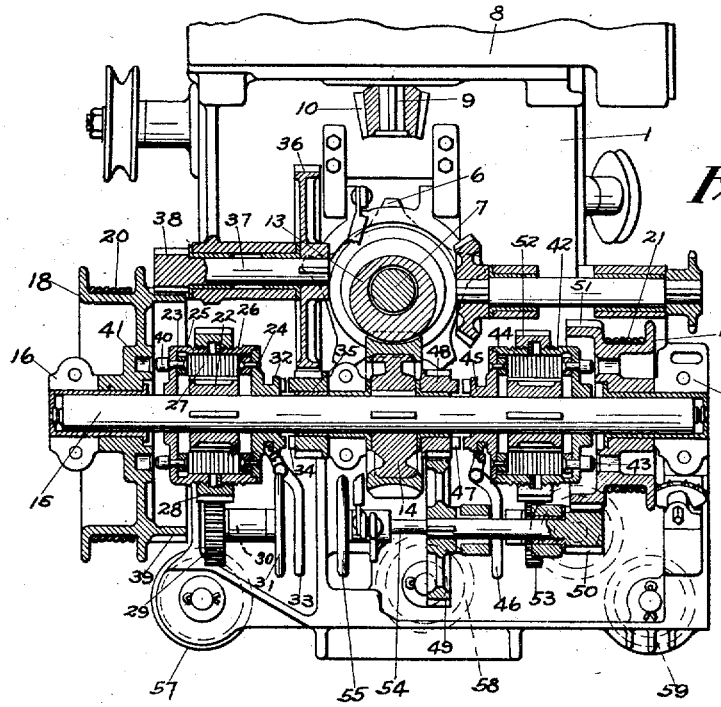
Figure 3 is a somewhat diagrammatic horizontal sectional view showing the arrangement of gearing in the machine illustrated in Figures 1 and 2.
Figure 4:
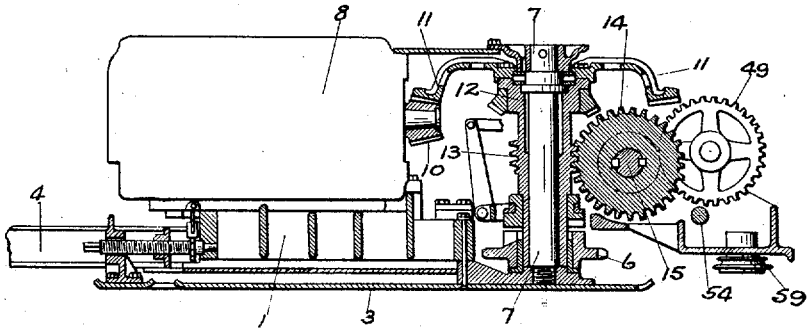
Figure 4 is a vertical sectional view taken along the line IV—IV of Figure 1.

Referring to the drawings the numeral 1 indicates the main frame casting upon which the operating parts of the machine are mounted. This main frame casting is attached to the upwardly turned flanges 2 of the skid pan 3 which is composed of a rolled steel plate, and which serves as a broad supporting base adapted to rest upon and slide in any direction over the floor of the mine. Attached to the main frame casting 1, and projecting longitudinally therefrom, is an elongated cutter arm 4, of the well known construction, having guideways wherein travels the cutter chain 5 in the manner common to mining machines of this type. The cutter chain 5 engages and is actuated by a sprocket wheel 6 rotatively mouted upon the vertical shaft 7 which is rigidly attached to the main frame of the machine. Suitable clutch mechanism is provided by which the sprocket wheel 6 may be connected with the power devices of the machine. Mounted upon the main frame 1 is a motor 8 which may be of any preferred construction suitable to the conditions under which the machine operates. For purposes of illustration I have shown an electric motor having an armature shaft 9 to which is secured the bevel pinion 10. The pinion 10 engages a master gear 11 rigidly connected with a sleeve 12 mounted upon the vertical shaft 7, and this sleeve 12 constitutes the driving member from which the several elements of the machine are actuated. As all of these devices are well understood in the mining machine art, and as they form no part in the present invention, further description of them is not thought to be required at this time.

Formed on the sleeve 12 is a worm 13 which engages a worm wheel 14 keyed to the horizontal power shaft 15 which is supported in journal bearings 16 and 17 of the main frame. Mounted for free rotation upon the shaft 15 one at each side of the worm wheel 14, are two winding drums 18 and 19 commonly known as the feed drum and the retarding drum respectively, and to each of these drums is attached a flexible cable 20 and 21 respectively, adapted to be connected to a suitable abutment external of the machine towards which the machine may be drawn by the winding of the cable upon its respective drum. Means which will now be described, is provided for the actuation of the drums 18 and 19 to wind their respective cables at relatively high speed, or at relatively low speed, to permit the unwinding of the cables under controlled frictional resistance, or to permit the said cable to freely unwind.

Splined to the shaft 15 and slidable longitudinally thereof is a hub 22 which constitutes the driving member of a multiple disc friction clutch, the driven member of which is formed by two discs 23 and 24 rotatably mounted upon the shaft 15 one at each side of the hub 22 and having inwardly projecting annular flanges 25 and 26 respectively. The hub 22 and flanges 25 and 26 are formed with longitudinally extending keys arranged to engage the appropriate notches in the friction discs 27 to connect the driving and driven elements of the clutch together in the manner well understood in the art. The outer surface of the flanges 25 and 26 are threaded with right and left hand screw threads in engagement with cooperating threads in the ring gear 28 in such manner that rotation of the ring gear 28 in one direction will draw the discs 23 and 24 together to compress the friction discs 27 to actuate the clutch, and rotation of the ring gear 28 in the opposite direction will spread the discs 23 and 24 apart to release the discs 27 in the manner which is well understood. A spur pinion 29 mounted upon a suitably supported shaft 30 engages the ring gear 28 and a hand wheel 31 attached to the shaft 30 affords convenient means for the rotation of the ring gear 28 and the control of the friction clutch. Formed on the disc 24 is a hub 32 in which is formed a groove which engages a shifting lever 33 by the manipulation of which the entire clutch mechanism from the face of the hub 32 are clutch teeth 34 adapted to engage with similar teeth on the end of a spur pinion 35 which is freely rotatable upon the shaft 15. By the engagement of the clutch teeth 34 the pinion 35 may be connected with the driving member of the friction clutch and through it with the power shaft 15. The pinion 35 engages a spur gear 36 which is attached to a counter shaft 37, and said counter shaft is formed integral with a pinion 38 arranged to engage a spur gear 39 formed integral with the feed drum 18. Through this train of gearing the drum 18 may be connected with the power shaft 15 to be driven in a cable winding direction at a speed greatly reduced from that of the power shaft 15. Projecting from the outer face of the disc 23 are a plurality of studs 40 adapted to engage suitable apertures 41 in the hub of the feed drum 18. When the studs 40 are in engagement with the apertures 41 the feed drum 18 is directly connected with the shaft 15 to revolve in a cable winding direction at the speed of the shaft. By the manipulation of the shifting lever 33 the feed drum 18 may be directly connected to the shaft to wind the cable at a relatively high speed or it may be connected through the gears 35, 36, 38 and 39 to wind the cable at a relatively low speed, and by the manipulation of the hand wheel 31 the friction clutch may be actuated to positively drive the feed drum 18 to wind the cable, or the pressure upon the friction discs 27 may be sufficiently released to permit the cable to unwind under a frictional resistance the degree of which may be controlled by manipulation of the hand wheel 31. By shifting the friction clutch to a neutral position midway between the winding drum 18 and the spur pinion 35 the winding drum may be entirely relieved from any retarding effect due to the action of the friction clutch.

The mechanism for the actuation of the retarding drum 19 is substantially similar to that provided for the actuation of the feed drum 18. A friction clutch of the same general construction as that above described is mounted upon the shaft 15 between the retarding drum 19 and the worm wheel 14. Its driving disc 42 is provided with lugs 43 adapted to engage suitable apertures in the retarding drum 19 and its driving disc 44 is provided with a hub 45 having a groove which engages a shifting lever 46. Formed on the hub 45 are jaw teeth 47 which engage similar teeth on the spur pinion 48 which is freely rotatable upon the shaft 15. The pinion 48 is connected through the spur gear 49 and pinion 50 with a spur gear 51 formed integral with the retarding drum 19. The driving discs 42 and 44 are arranged to be drawn together by the rotation of a ring gear 52 in the manner above described. A spur gear 53 which meshes with the ring gear 52 is attached to a shaft 54 to which is attached the hand wheel 55. By the manipulation of the hand wheel 55 and the shifting lever 46 the retarding drum 19 may be connected with the power shaft 15 to wind the cable 21 at a relatively high speed or at a relatively low speed, or to permit the unwinding of said cable under a controlled frictional resistance or to permit the free unwinding of the cable.

Suitable guide sheaves 56, 57, 58, 59 and 60 are mounted upon the frame of the machine, and the cables 20 and 21 after passing around any preferred guide sheaves may be led in any preferred direction from the machine and attached to suitably positioned anchor jacks in the manner which is well understood in the mining machine art. Owing to the similarity of the power transmission elements associated with the winding drums 18 and 19, the cables 20 and 21 may be simultaneously or separately wound upon the respective drums at relatively high handling speed or at the relatively low feeding speed or either or both of them may be permitted to unwind under optionally controlled resistance or without such resistance as occasion may require.

What I claim is:

1. In a machine of the class described, a main frame movable over a mine floor, a motor mounted on said frame, a pair of winding elements mounted on said frame, plural speed transmission mechanism adapted to be driven by said motor, and controllable connections between said mechanism and winding elements whereby each element may be driven at either of a plurality of speeds while the other is simultaneously driven at either of a plurality of speeds, said connections including an independent friction clutch associated with each winding element and adapted to control the rotation thereof at either speed.

2. In a machine of the class described, a main frame movable over a mine floor, a motor mounted on said frame, a pair of winding elements mounted coaxially on said frame, a plural speed transmission mechanism adapted to be driven by said motor, and controllable connections between said mechanism and winding elements whereby each element may be driven at either of a plurality of speeds while the other is simultaneously driven at either of a plurality of speeds, said connections including an independent friction clutch associated with each winding element and adapted to control the rotation thereof at either speed.

3. In a machine of the class described, a main frame movable over a mine floor, a motor mounted on said frame, a pair of winding elements mounted on said frame, plural speed transmission mechanism adapted to be driven by said motor, and controllable connections between said mechanism and winding elements whereby each element may be driven at either of a plurality of speeds while the other is simultaneously driven at either of a plurality of speeds, said connections including an independent friction clutch associated with each winding element in coaxial relation thereto and adapted to control the rotation thereof at either speed.

4. In a machine of the class described, a main frame movable over a mine floor, a motor mounted on said frame, a pair of winding elements mounted coaxially on said frame, plural speed transmission mechanism adapted to be driven by said motor, and controllable connections between said mechanism and winding elements whereby each element may be driven at either of a plurality of speeds while the other is simultaneously driven at either of a plurality of speeds, said connections including an independent friction clutch associated with each winding element in coaxial relation thereto and adapted to control the rotation thereof at either speed.

5. In a machine of the class described, a main frame movable over a mine floor, a motor mounted on said frame, a horizontally extending shaft journaled on said frame, a pair of winding elements revoluble on said shaft, a separate friction clutch associated with each of said winding elements and each having a driving element on said shaft and driven by the latter, means to independently connect the driven elements of said clutches directly to their associated winding elements, reduction gearing associated with each of said winding elements, and means to independently connect the driven elements of said clutches to the reduction gearing of their associated drums, whereby the winding elements may be simultaneously driven at the same or different speeds and independently controlled at either speed through their respective clutches.

6. In a mining machine, the combination of a main frame movable over a mine floor, a motor mounted on said frame, feeding and guiding mechanism comprising a pair of winding elements mounted on said frame, and plural speed driving connections for each of said winding elements whereby either may be driven at a relatively fast or at a relatively slow speed in the winding direction while the other is simultaneously driven in the winding direction at a speed corresponding to that of the first or at a different speed, said connections including a separate friction clutch associated with each of said winding elements and adapted to independently control the rotation of the latter while driven at either speed.

7. In a mining machine, the combination of a main frame movable over a mine floor, a motor mounted on said frame, feeding and guiding mechanism comprising a pair of winding elements coaxially mounted on said frame, and plural speed driving connections for each of said winding elements whereby either may be driven at a relatively fast or at a relatively slow speed in the winding direction while the other is simultaneously driven in the winding direction at a speed corresponding to that of the first or at a different speed, said connections including a separate friction clutch associated with each of said winding elements and adapted to independently control the rotation of the latter while driven at either speed.

8. In a mining machine, the combination of a main frame movable over a mine floor, a motor mounted on said frame, feeding and guiding mechanism comprising a pair of winding elements mounted on said frame, and plural speed driving connections for each of said winding elements whereby either may be driven at a relatively fast or at a relatively slow speed in the winding direction while the other is simultaneously driven in the winding direction at a speed corresponding to that of the first or at a different speed, said connections including a separate friction clutch associated with each of said winding elements and adapted to independently control the rotation of the latter while driven at either speed, said clutches being coaxially mounted.

9. In a mining machine, the combination of a main frame movable over a mine floor, a motor mounted on said frame, a horizontally extending shaft journaled on said frame, feeding and guiding mechanism comprising a pair of winding elements revoluble on said shaft, and plural speed driving connections for each of said winding elements whereby either may be driven at a relatively fast or at a relatively slow speed in the winding direction while the other is simultaneously driven in the winding direction at a speed corresponding to that of the first or at a different speed, said connections including a separate friction clutch on said shaft associated with each of said winding elements and adapted to independently control the rotation of the latter while driven at either speed.

10. In a mining machine of the class described, the combination with a main frame adapted to rest upon and slide in any direction over the mine floor, of an elongated kerf cutter projecting horizontally from said frame, two winding drums mounted upon said frame with their axes extending transversely thereof, power devices upon the frame, and clutch mechanism adapted to connect said drums with said power devices to cause said drums to revolve in winding direction either simultaneously or separately at relatively high speed or at relatively low speed and a frictionally controlled mechanism for each drum and adapted to connect said drums separately or simultaneously with said power devices and to control the speed of said drums independently of each other.

11. In a mining machine of the class described, the combination with a main frame adapted to rest upon and slide in any direction over the mine floor, of an elongated kerf cutter projecting from said frame, power devices upon the frame comprising a horizontal transversely extending shaft, two winding drums mounted upon said shaft for free rotation thereon, and clutch mechanism on said shaft adapted to connect either or both of said winding drums directly to said shaft to rotate therewith or indirectly with said shaft to rotate thereon in the same direction but at reduced speed.

12. In a mining machine of the class described, the combination with a main frame, of an elongated kerf cutter projecting from said frame, power devices upon the frame comprising a horizontal transversely extending shaft, two winding drums mounted upon said shaft for free rotation thereon, and a separate frictionally controlled mechanism for each drum mounted on said shaft and adapted to connect said drums separately or simultaneously with said power devices and to control the speed of said drums independently of each other.

13. In a mining machine of the class described, the combination with a main frame adapted to rest upon and slide in any direction over the mine floor, of an elongated kerf cutter projecting horizontally from said frame, power devices upon the frame comprising a horizontal transversely extending shaft, two winding drums mounted upon said shaft for free rotation relative thereto, and clutch mechanism adapted to connect either or both of said winding drums directly to said shaft to rotate therewith or indirectly with said shaft to rotate thereon in the same direction but at reduced speed or to permit their rotation in the opposite direction under optionally controlled resistance or to permit their rotation without said resistance as and for the purpose set forth.

14. In a mining machine of the class described, the combination with a main frame adapted to rest upon and slide in any direction over the mine floor, of a longitudinally extending kerf cutter projecting horizontally from said frame, power devices upon the frame comprising a shaft, a winding drum mounted upon said shaft for free rotation relative thereto, transmission mechanism adapted to connect said winding drum with said shaft comprising a clutch element slidably mounted upon said shaft and adapted to be moved in one direction to connect said winding drum directly with said clutch element to revolve therewith, and to be moved in the opposite direction to connect said winding drum indirectly with said clutch element to revolve in the same direction at reduced speed, and frictional devices to connect said clutch element with said shaft as and for the purpose set forth.

15. In a mining machine of the class described, the combination with a main frame adapted to rest upon and slide in any direction over the mine floor, of a longitudinally extending kerf cutter projecting horizontally from said frame, power devices upon the frame comprising a shaft, a winding drum mounted upon said shaft for free rotation relative thereto, transmission mechanism adapted to connect said winding drum with said shaft and adapted to be moved in one direction to connect said drum directly with said clutch element to revolve therewith and to be moved in the opposite direction to connect said winding drum indirectly with said driving element to revolve in the same direction at reduced speed, frictional devices to connect said clutch element with said shaft, means to slide said clutch element longitudinally of the shaft, and means to control said frictional devices as and for the purpose set forth.

16. In a mining machine of the class described, the combination with a main frame, of an elongated kerf cutter projecting from said frame, power devices upon the frame comprising a horizontal transversely extending shaft, two winding drums mounted upon said shaft for free rotation thereon, speed reducing gearing between the shaft and drums, and a separate clutch mechanism for each drum and speed reducing mechanism mounted on said shaft and including means to optionally vary resistance offered by the clutch mechanism.

17. In a mining machine of the class described, the combination with a main frame, of an elongated kerf cutter projecting from said frame, power devices upon the frame comprising a horizontal transversely extending shaft, two winding drums mounted upon said shaft for free rotation thereon, speed reducing gearing between the shaft and drums, and a separate clutch mechanism for each drum adapted to connect its respective drum directly to the shaft or indirectly therewith through the speed reducing gearing, said clutch mechanism each including means to optionally vary the resistance offered by the clutch mechanism.

In testimony whereof I hereunto affix my hand.

CHARLES E. WAXBOM.